(No Model.)
A. JACOBS.
SAW TOOTH SWAGING MACHINE.
No. 319,262.  Patented June 2, 1885.
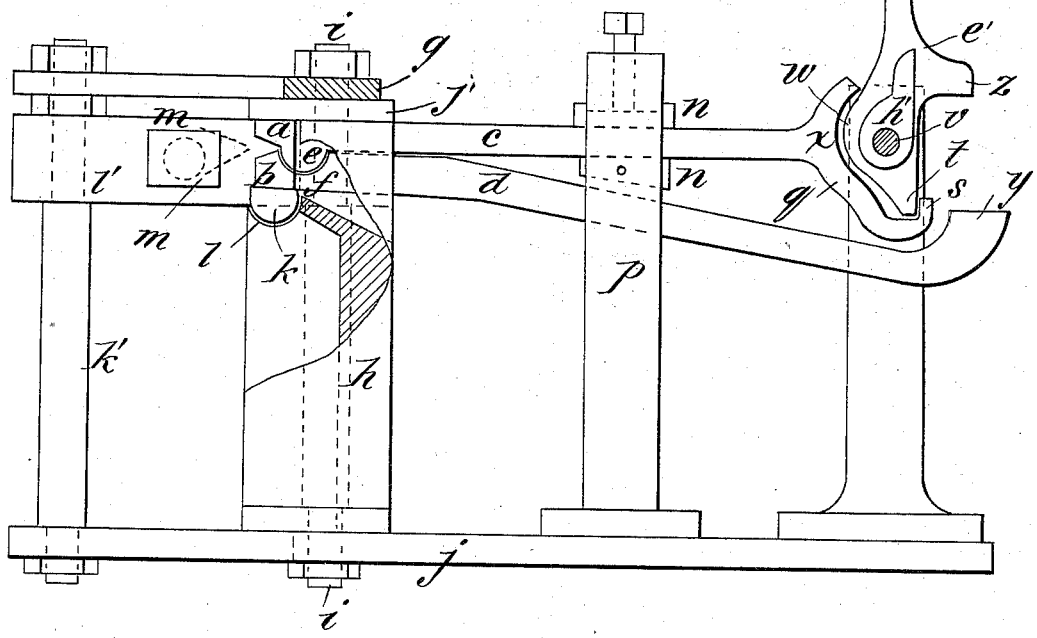
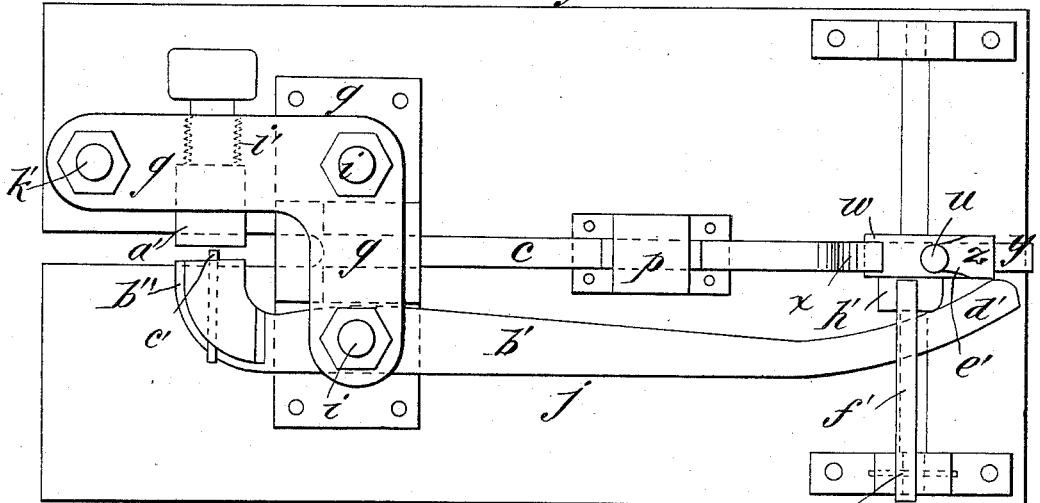
WITNESSES:
C. Bischoff
C. Sedgwick
INVENTOR:
A. Jacobs
BY Munn & Co
ATTORNEYS.

UNITED STATES PATENT OFFICE.

ALEXANDER JACOBS, OF CHEBOYGAN, MICHIGAN.

SAW-TOOTH-SWAGING MACHINE.

SPECIFICATION forming part of Letters Patent No. 319,262, dated June 2, 1885.

Application filed June 27, 1884. (No model.)

*To all whom it may concern:*

Be it known that I, ALEXANDER JACOBS, of Cheboygan, in the county of Cheboygan and State of Michigan, have invented a new and Improved Saw-Tooth Swage, of which the following is a full, clear, and exact description.

My invention consists of a pair of swaging-dies contrived to shift forward onto the point of a saw-tooth, pinch and swage out the point to the shape required, then shift back to allow the saw to be shifted along to present another tooth, together with contrivances for gaging and holding the teeth sidewise according as they are required to be presented to the swaging-dies, the whole being a very simple and cheap, but efficient machine for upsetting the teeth of timber-saws, all as hereinafter fully described.

Reference is to be had to the accompanying drawings, forming part of this specification, in which similar letters of reference indicate corresponding parts in both the figures.

Figure 1 is partly a side elevation and partly a sectional elevation of my improved saw-tooth-swaging machine, and Fig. 2 is a plan view.

For gripping and swaging, dies $a$ and $b$ are formed on the ends of the arms $c$ and $d$, respectively, which are so pivoted together by the semicircular boss $e$ on arm $c$, resting in the corresponding cavity, $f$, in the other that said arms are capable of working the jaws $a$ $b$ in the manner of grippers to pinch and spread the points of the saw-teeth between them; but this joint is merely employed to maintain the jaws in their proper relative positions, and is not the means by which the jaws are held to apply the pressure to the saw-teeth. For this purpose, which requires means of very great strength, the arm $c$ is arranged under the strong plate $g$, firmly bolted down on the top of the jaw-stand $h$ by the posts $i$, which extend down through the jaw-stand and base-plate $j$. The lower arm, $d$, rests on the semicircular or rocker pivot $k$, resting in the corresponding cavities, $l$, of the jaw-stand, the jaw-arms being thus so arranged that they can be shifted forward between said plate $g$ and rocker-pivot $k$ onto the point of the saw-tooth (indicated by dotted lines in Fig. 1) to swage it, and back to the position in which said jaws are represented in said figure for allowing the saw-tooth to be shifted along past the jaws as they are swaged, the saw being on its mandrel, if the circular kind, or in a straight holder, along which it can slide, if of the straight form. It will be seen that when the jaws are shifted forward to grip the teeth pivoted boss $e$ and $f$ rest over the rocker-pivot $k$, so that they are practically as one pivot, whereon jaw $b$ is forced upward against the teeth when lever-arm $d$ is thrust downward. It is also to be noted that when the jaws are drawn back away from the tooth, jaw $b$ drops slightly away from the upper jaw, owing to a slight downward inclination of the lower side of jaw-arm $d$ to slacken the said jaw-arms between plate $g$ and rocker-pivot $k$ to enable them to work freely, and when they are shifted forward they wedge up tight and firm for exact and positive action.

For shifting the jaws forward and backward and closing them on the points of the teeth, the arm $c$ is fitted between supporting-blocks $n$ on the post $p$, so as to be firmly held in position, but at the same time to allow it to slide freely, and back of said post said arm has an inclined branch, $q$, terminating in a hook end, $s$, between which hook end and inclined branch the nose $t$ of a lever, $u$, pivoted on a post at $v$, works to shift the jaws forward and backward, according as the lever is turned to thrust the nose $t$ forward against the inclined branch $q$ or backward against the hook $t$. At $w$ the lever has a boss, against which the crotch $x$ abuts to stop the back movement of the jaw at the right point. The other jaw-arm, $d$, hangs free under arm $c$, and its end $y$ is turned upward back of the hook end of arm $c$, suitably for receiving the thrust of a stud, $z$, on the lever $u$, at the same time that said lever $u$ is thrust down to shift the jaws forward, which presses down said lever and thrusts up jaw $b$ to pinch and swage the tooth.

To control the saw laterally with relation to the swaging-jaws, I employ an adjustable side gage, $a'$, against which the teeth are to rest at one side, together with a lever-head, $b''$, to press on the other side of the teeth and hold them up to said gage, and a stop-gage, $c'$, on said lever-head to extend across the back of the teeth and stop the turning or shifting of the saw along the swaging-jaws from tooth to tooth. The lever $b'$ is pivoted to one of the posts $i$, and extends back alongside of the jaw-working lever $u$, and is curved at $d'$ so that when said lever is forced down to work the jaws it also forces the lever outward and causes head $b''$ to press the teeth against the gage $a'$, by the part $e$ of said lever $u$ acting on the curved part $d'$ of lever $b'$. This operation takes place in the early part of the movement of lever $u$, and before the stud $z$ forces lever-arm $d$ down, the lever $u$ escaping past the end of curved arm $d'$ of lever $b'$; but a hook-catch, $f'$, pivoted to a support at $g'$, falls down over arm $d'$ before lever $u$ escapes from it, to hold said lever-head $b''$ until the swaging is completed. To release said lever $b'$ when the swaging is completed, a cam, $h'$, is attached to the side of lever $u$, which rises up under the free end of the catch $f'$ when lever $u$ is raised, and lifts the catch up clear of the arm $d'$. The catch rests on the upper end of cam $h'$, and holds the catch up until lever $u$ goes down again. The gage $a'$ is adjustable by a screw, $i'$, and may be used to set the saws to right or left of the swage-jaws, according as it may be preferred to incline the set of the points of the teeth more to one side than the other of the saws by the swaging-jaws, which is sometimes desirable in the case of saws that may be inclined to run in the log from the true course for any cause. A packing-plate, $j'$, is arranged between the upper jaw-arm, $c$, and the cap-plate $g$ for a hard and smooth bearing to be refitted and replaced, as required, and the cap-plate is made in triangular form to be set up on the posts $i$, suitably arranged for supporting the jaws between them, and a post, $k'$, which, with one of the posts $i$ forms the support of the arm $l'$ on which the gage $a'$ rests.

Having thus described my invention, what I claim as new, and desire to secure by Letters Patent, is—

1. The combination of a pair of gripping and swaging jaws, $a\ b$, arranged to shift to and from the saw-teeth, and having a working-lever, $u$, arranged to so shift them and also to effect action of said jaws for gripping and swaging the teeth, substantially as described.

2. The combination of a side gage, $a'$, and lever $b'$ with the gripping and swaging jaws $a\ b$ and the working-lever $u$, said jaws being arranged to shift to and from the teeth and grip and swage the points, and the side gage, $a'$ and $b'$, arranged to gage and hold the teeth laterally while being swaged, substantially as described.

3. The gripping-jaws $a\ b$ and arms $c\ d$, connected by pivot-boss $e$ and cavity $f$, and arranged between cap $g$ and rocker-bearing $k$, to be shifted to and from the saw-teeth and to grip and swage the points of said teeth, substantially as described.

4. The combination, with the gripping-jaws $a\ b$ and arms $c\ d$, connected by pivot-boss $e$ and cavity $f$, and arranged between cap $g$ and roller-bearing $k$, of the lever $u\ t$, inclined and hook-ended arm $q\ s$, stud $z$, and the curved end $y$ of arm $d$, for shifting the jaws and swaging the teeth, substantially as described.

5. The side gage lever, $b'\ d'$, in combination with the gripping-jaws $a\ b$, arms $c\ d$, and the lever $u$, for working said jaws, said lever $u$ and lever $b'\ d'$ being arranged for action conjointly with the action of the gripping-jaws, substantially as described.

6. The catch $f'$ and cam $h'$, in combination with the lever $b'\ d'$, and lever $u$, said lever $u$ being arranged for simultaneously operating the jaw-arms $c\ d$ and the side gage lever, $b'\ d'$, substantially as described.

7. The combination, with the jaw-arm $c$, arranged with jaw-arm $d$, also arranged in supporting-guides $n$, and provided with crotch $x$, inclined arm $q$, and hook end $s$, of the lever $u$, having nose $t$ and stop-boss $w$, substantially as described.

8. The stop-gage $e$, in combination with the lever-head $b''$, side gage, $a'$, and the swaging-jaws $a\ b$, said jaws being arranged to shift to and from the teeth and to swage the same, substantially as described.

ALEXANDER JACOBS.

Witnesses:
EDWIN Z. PERKINS,
SAML. H. TAYLOR.